US009244666B2

(12) United States Patent
Nakaike et al.

(10) Patent No.: US 9,244,666 B2
(45) Date of Patent: Jan. 26, 2016

(54) GLOBALLY INLINE A CALLEE WITH HIGH COST-EFFECTIVENESS ON THE BASIS ONLY OF PROFILE INFORMATION IN A CALL GRAPH

(71) Applicant: International Business Machines Corporation, Armonk, NY (US)

(72) Inventors: Takuya Nakaike, Yokohama (JP); Toshio Suganuma, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/631,207

(22) Filed: Feb. 25, 2015

(65) Prior Publication Data
US 2015/0268941 A1    Sep. 24, 2015

(30) Foreign Application Priority Data

Mar. 20, 2014    (JP) ................................. 2014-058055

(51) Int. Cl.
G06F 9/45    (2006.01)
(52) U.S. Cl.
CPC .................................... G06F 8/4443 (2013.01)
(58) Field of Classification Search
CPC .................................................... G06F 8/4443
USPC ................................................. 717/151–161
See application file for complete search history.

(56) References Cited

U.S. PATENT DOCUMENTS 5,740,443 A * 4/1998 Carini ........................... 717/133
6,072,951 A * 6/2000 Donovan et al. ............... 717/158
6,292,940 B1 * 9/2001 Sato ............................... 717/157
7,302,679 B2 * 11/2007 Chakrabarti et al. ......... 717/144
7,340,732 B2 * 3/2008 Gu ................................. 717/150
(Continued)

FOREIGN PATENT DOCUMENTS

JP    06202875 A    7/1994
JP    H11212797 A    8/1999
(Continued)

OTHER PUBLICATIONS

Arnold, Matthew et al., "A Comparative Study of Static and Dynamic Heuristics for Inlining", ACM SIGPLAN Workshop on Dynamic and Adaptive Compilation and Optimization (DYNAMO'00), Jan. 2000, 18 pages.
(Continued)

Primary Examiner — Qing Chen
(74) Attorney, Agent, or Firm — Francis Lammes; Stephen J. Walder, Jr.; William J. Stock

(57) ABSTRACT

A mechanism is provided to globally inline a callee with high cost-effectiveness on the basis only of profile information in a call graph, without looking through all call-graph edges. The mechanism provides a technique for inlining. An inline cost-effectiveness ratio for the callee reachable from a caller to be compiled is calculated. Calculating the inline cost-effectiveness ration includes using a ratio of a frequency of calls to the callee to a total of call frequencies as effectiveness and using a ratio of a code size of the callee to a total size of inlinable code as cost. A determination is made as to whether to inline the callee by comparing the inline cost-effectiveness ratio with a predetermined threshold. The callee is inlined into a source code in response to determining that the callee method is to be inlined.

19 Claims, 6 Drawing Sheets

(56) References Cited

U.S. PATENT DOCUMENTS

| | | | |
|---|---|---|---|
| 7,996,825 B2* | 8/2011 | Chakrabarti et al. | 717/140 |
| 2005/0044538 A1* | 2/2005 | Mantripragada | 717/151 |
| 2005/0097527 A1* | 5/2005 | Chakrabarti et al. | 717/140 |
| 2005/0097528 A1* | 5/2005 | Chakrabarti et al. | 717/140 |
| 2005/0097533 A1* | 5/2005 | Chakrabarti et al. | 717/144 |
| 2005/0262491 A1* | 11/2005 | Gu | 717/151 |

FOREIGN PATENT DOCUMENTS

| | | |
|---|---|---|
| JP | H11306026 A | 11/1999 |
| JP | 2001188681 A | 7/2001 |
| JP | 2004062234 A | 2/2004 |

OTHER PUBLICATIONS

Boehm, Omer et al., "Aggressive Function Inlining with Global Code Reordering", IBM Corporation, IBM Research Report, Computer Science H-0247 (H0611-009), Nov. 15, 2006, 26 pages.

Cavazos, John et al., "Automatic Tuning of Inlining Heuristics", Proceedings of the 2005 ACM/IEEE SC Conference (SC'05), Seattle, Washington, Nov. 12-18, 2005, 11 pages.

Chakrabarti, Dhruva R. et al., "Inline Analysis: Beyond Selection Heuristics", Proceedings of the International Symposium on Code Generation and Optimization (CGO'06), New York, New York, Mar. 26-29, 2006, 12 pages.

Chang, Pohua P. et al., "Profile-guided Automatic Inline Expansion for C Programs", Software-Practice and Experience, vol. 22(5), Received Apr. 15, 1991, Revised Nov. 1991, Published May 1992, 21 pages.

Hazelwood, Kim et al., "Adaptive Online Context-Sensitive Inlining", Proceedings of the International Symposium on Code Generation and Optimization (CGO'03), Feedback-Directed and Runtime Optimization, Mar. 23, 2003, pp. 253-264.

Hwu, Wen-Mei et al., "Inline Function Expansion for Compiling C Programs", Proceedings of the ACM SIGPLAN 1989 Conference on Programming Language Design and Implementation, vol. 24, Issue 7, Jul. 1989, pp. 246-257.

Kulkarni, Sameer et al., "Automatic Construction of Inlining Heuristics using Machine Learning", Proceedings of the 2013 IEEE/ACM International Symposium on Code Generation and Optimization (CGO'13), Shenzhen, China, Feb. 23-27, 2013, 12 pages.

Suganuma, Toshio et al., "Design and Evaluation of Dynamic Optimizations for a Java Just-In-Time Compiler", ACM Transactions on Programming Languages and Systems, vol. 27, No. 4, Jul. 2005, 54 pages.

Zhao, Peng et al., "To Inline or Not to Inline? Enhanced Inlining Decisions", 16th Workshop on Languages and Compilers for Parallel Computing, College Station, Texas, Oct. 2-4, 2003, 15 pages.

\* cited by examiner

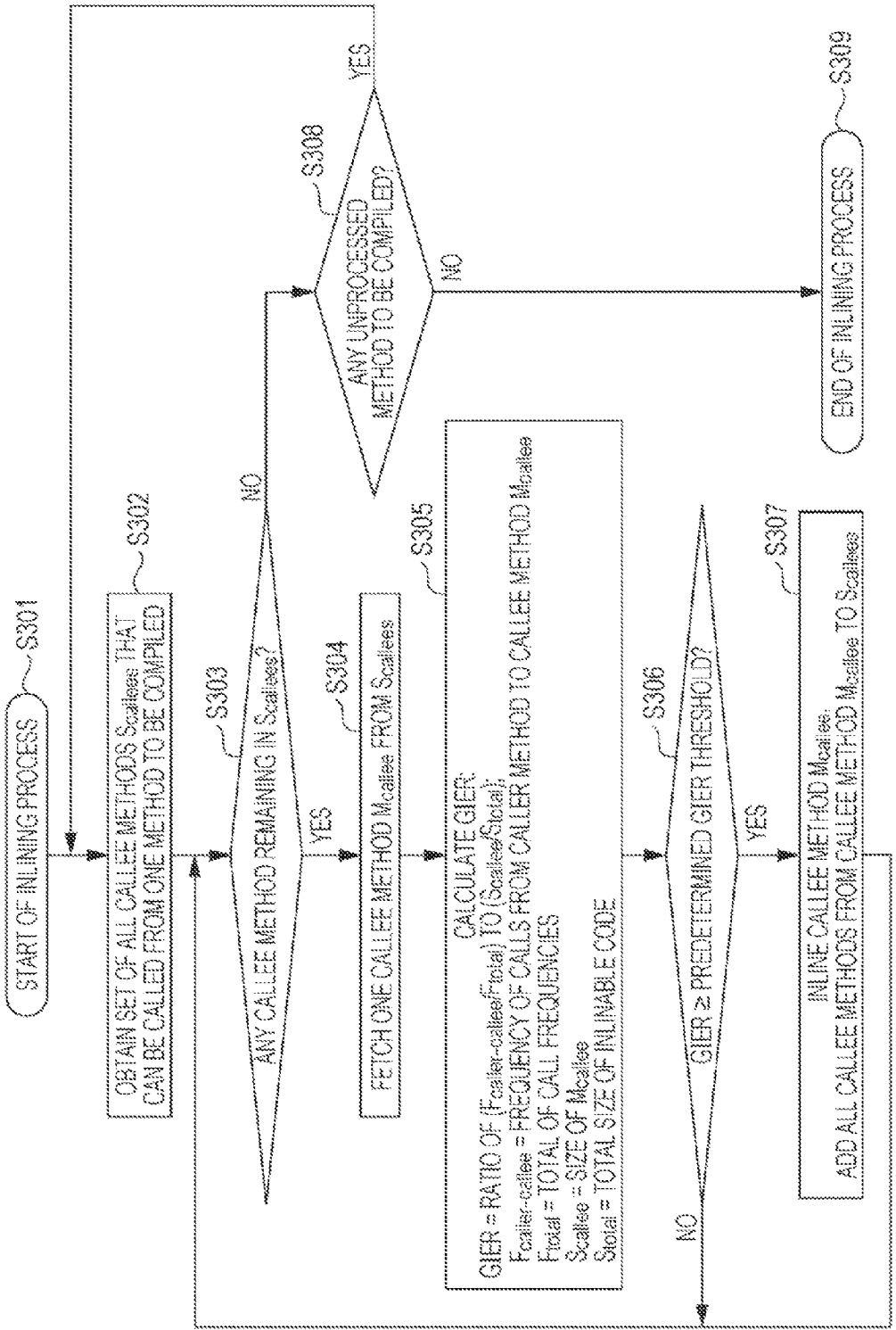

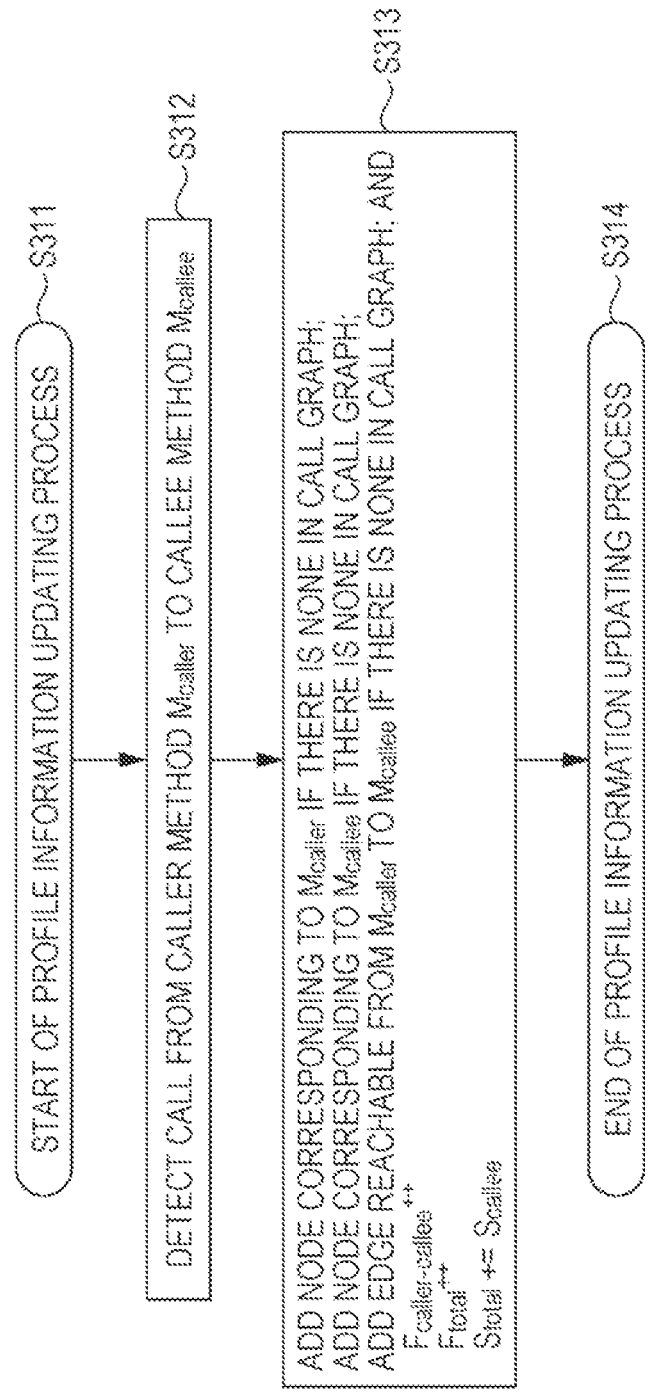

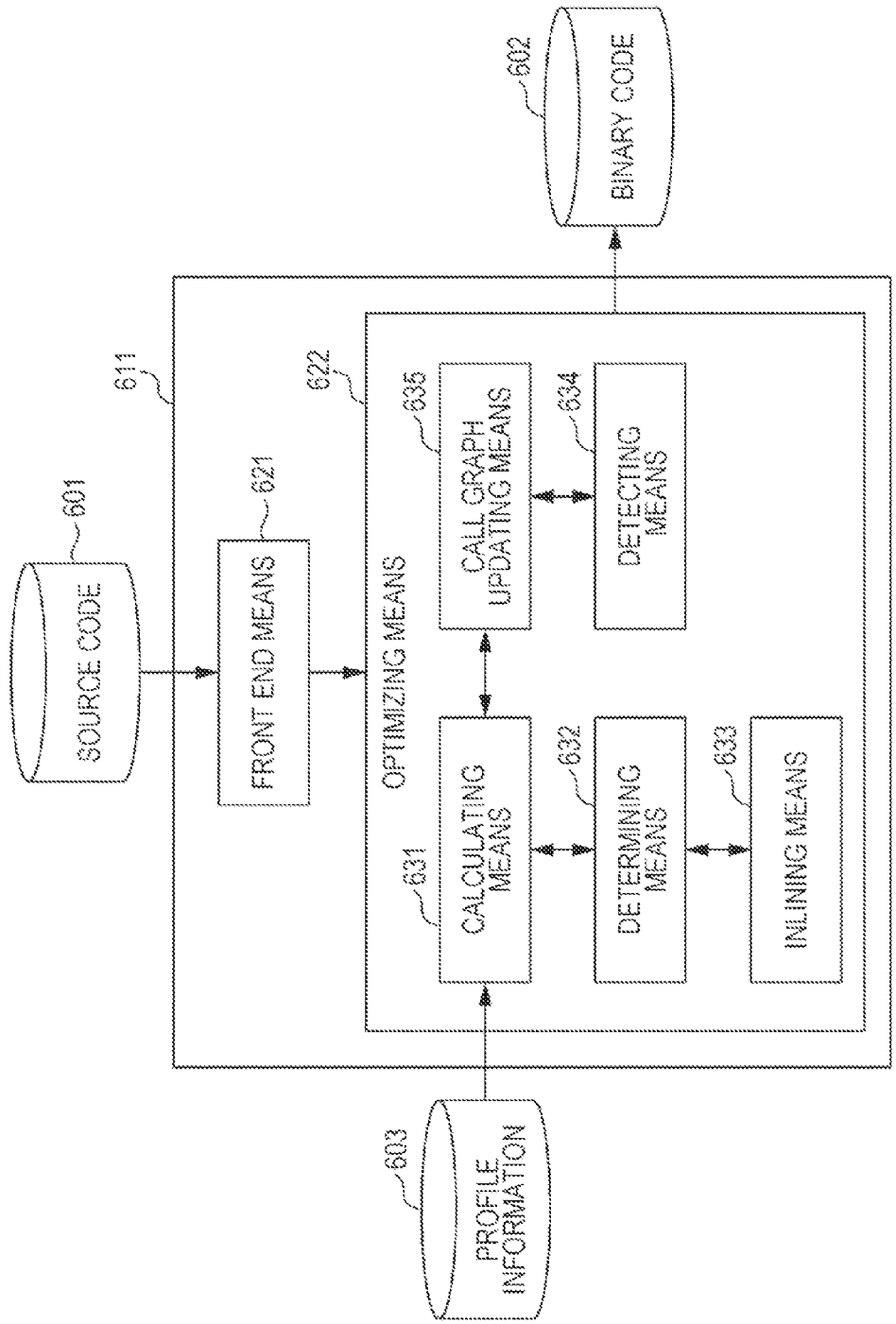

GLOBALLY INLINE A CALLEE WITH HIGH COST-EFFECTIVENESS ON THE BASIS ONLY OF PROFILE INFORMATION IN A CALL GRAPH

BACKGROUND

The present invention relates to a compiler technique, and particularly relates to inlining which is a compiler optimization technique.

Inlining is also referred to as inline expansion or inline function expansion, and is one of most important optimization techniques for compilers. Inlining is a technique in which optimization is achieved by expanding code for a function called by a function caller and preventing control from being transferred to the function.

Function inlining is performed by inserting a directive, such as an inline keyword, into source code during coding.

For example, inlining can (1) reduce overhead associated with calls and returns, (2) expand the range of compiler optimization, and (3) improve spatial locality of code. Inlining is particularly effective for functions which are small and frequently called.

By default, a compiler can automatically determine whether code is to be inline-expanded.

Japanese Patent Application Publication No. 6-202875 describes a compiler that performs optimization through inline expansion. The compiler includes control flow weighting means for estimating the number of executions of each partial control flow included in a control flow on the basis of a result of analysis by control flow analyzing means, and weighting each partial control flow on the basis of the number of executions; and object generating means for determining, with reference to a result of the weighting performed by the control flow weighting means, the necessity of inline expansion of a function called by each function call, and generating an object program reflecting the determination.

Japanese Patent Application Publication No. 11-212797 describes a program converting method for converting a source program written in a programming language to an object program written in a language executable by a computer or processor, characterized in that the object program is generated by changing indirect calling code to direct calling code, wherein, in the indirect calling code, on the basis of information about a procedure, function, or subroutine obtained in the process of converting the source program to the object program, identification information of the procedure, function, or subroutine is assigned to a specific variable at a point in a program, and the procedure, function, or subroutine is indirectly called by using the variable at another point, whereas in the direct calling code, the procedure, function, or subroutine is directly called at a point in the program.

Japanese Patent Application Publication No. 2001-188681 describes an inline expansion method that includes the steps of translating source code into object code without inline-expanding at least some of functions included in the source code; selectively changing the object code; executing the object code and measuring the number of calls and the processing time of the at least some of the functions; and selectively inline-expanding the at least some of the functions included in the source code with reference to the number of calls and the processing time.

Japanese Patent Application Publication No. 11-306026 describes a code optimization method related to a CPU having a plurality of instruction sets. The code optimization method includes a cost calculating step of calculating a cost of program code to be optimized on the basis of a cost evaluation table, and storing a result of the calculation; and an optimization-instruction-set selecting step of selecting an optimum instruction set from the stored result of the calculation. In this code optimization method, the cost calculating step inline-expands the program code, calculates a cost of the inline-expanded program code on the basis of the cost evaluation table, and stores a result of the calculation.

Japanese Patent Application Publication No. 2004-62234 describes a compile program running on a computer and converting a source program including a function call to object code. In the compile program, if a function to be inline-expanded is called from the same function at a plurality of points, expansion code for the callee function is shared by using a branch instruction from the call points.

D. R. Chakrabarti and S. Liu, "Inline Analysis: Beyond Selection Heuristics", Proceedings of the International Symposium on Code Generation and Optimization, pages 221-232, 2006; O. Beohm, D. Citron, G. Harber, M. Klausner, and R. Levin, "IBM Research Report, Aggressive Function Inlining with Global Code Reordering", Computer Science, H-0247 (H0611-009), Nov. 15, 2006; P. P. Chang and W. W. Hwu, "Inline function expansion for compiling C programs", Proceedings of the ACM SIGPLAN 1989 Conference on Programming language design and implementation, pages 246-257, 1989; and P. P. Chang, S. A. Mahlke, W. Y. Chen, and W. W. Hwu, "Profile-guided automatic inline expansion for C programs", Software Practice and Experience", Vol. 22(5), pages 349-369, May 1992, each describe an inlining technique for static compilers.

J. Cavazos and M. F. P. O'Boyle, "Automatic Tuning of Inlining Heuristics", Proceedings of the 2005 ACM/IEEE SC Conference, page 14, November 2005; K. Hazelwood and D. Grove, "Adaptive Online Context-Sensitive Inlining", Proceedings of the international symposium on Code generation and optimization", feedback-directed and runtime optimization, pages 253-264, 2003; M. Arnold, S. Fink, V. Sarkar, and P. Sweeney, "A comparative study of static and dynamic heuristics for inlining", ACM SIGPLAN Workshop on Dynamic and Adaptive Compilation and Optimization, 2000; S. Kulkarni, J. Cavazos, C. Wimmer, and D. Simon, "Automatic construction of inlining heuristics using machine learning", Proceedings of the 2013 IEEE/ACM International Symposium on Code Generation and Optimization, 2013; and T. Suganuma, T. Yasue, M. Kawahito, H. Komatsu, and T. Nakatani, "Design and Evaluation of Dynamic Optimizations for a Java Just-In-Time Compiler", ACM Transactions on Programming Languages and Systems, Vol. 27, No. 4, pages 732-785, July 2005 each describe an inlining technique for dynamic compilers.

P. Zhao and J. N. Amaral, "To Inline or Not to Inline? Enhanced Inlining Decision", 16th Workshop on Languages and Compilers for Parallel Computing, 2003 describes an inlining technique based on temperature heuristics.

SUMMARY

In one illustrative embodiment, a method is provided for inlining. The illustrative embodiment calculates an inline cost-effectiveness ratio for a callee reachable from a caller to be compiled. In the illustrative embodiment, calculating the inline cost-effectiveness ratio includes using a ratio of a frequency of calls to the callee to a total of call frequencies as effectiveness, and using a ratio of a code size of the callee to a total size of inlinable code as cost. The illustrative embodiment determines whether to inline the callee by comparing the inline cost-effectiveness ratio with a predetermined threshold. The illustrative embodiment inlines the callee into a source code in response to determining that the callee is to be inlined.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

FIG. 3A is a flowchart of an inlining process according to the embodiment of the present invention, and is, in particular, a flowchart for inlining a callee method.

FIG. 3B is a flowchart of an inlining process according to the embodiment of the present invention, and is, in particular, a flowchart for updating profile information.

FIG. 6 is a functional block diagram of a computer that preferably has a hardware configuration according to FIG. 1, and performs an inlining process for inlining a callee method according to the embodiment of the present invention.

DETAILED DESCRIPTION

Figure 1:
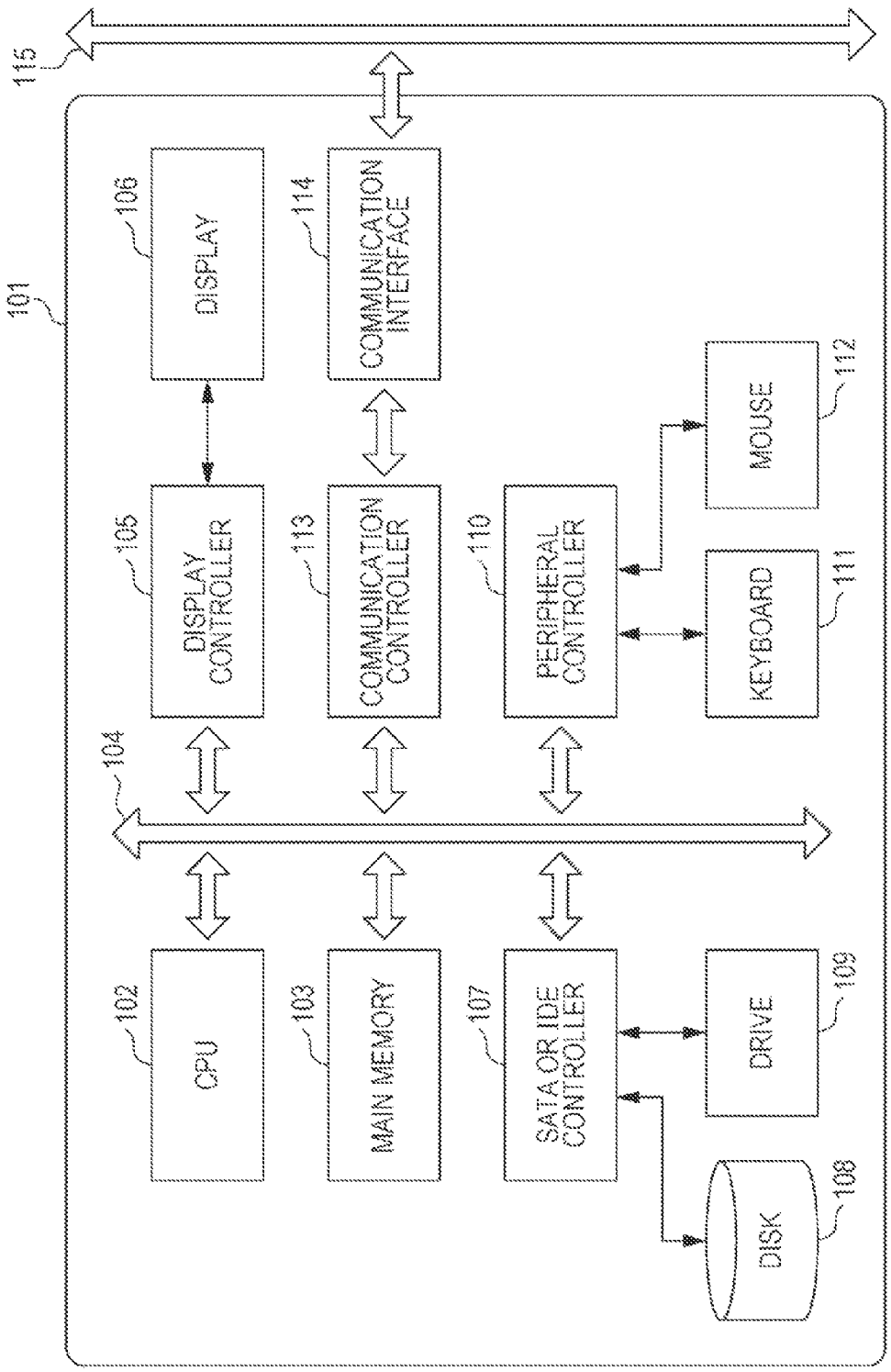
FIG. 1 illustrates a computer that is according to, or that can be used in, an embodiment of the present invention.

Embodiments of the present invention will be described with reference to the drawings. Throughout the drawings, the same reference numerals are used to refer to the same components unless otherwise specified. It is to be understood that the embodiments of the present invention are provided to describe preferred aspects of the present invention, and are not intended to limit the scope of the present invention to those described herein.

A computer that can be used in the embodiments of the present invention is not limited to a specific one, as long as it is a computer capable of performing inlining. The computer may be, for example, a mainframe computer, a server computer, a desktop computer, a notebook computer or integrated personal computer, or a tablet terminal or smartphone (e.g., a Windows (registered trademark)-based, Android (registered trademark)-based, or iOS-based tablet terminal or smartphone).

FIG. 1 illustrates a computer that is according to, or that can be used in, an embodiment of the present invention.

A computer 101 includes a CPU 102 and a main memory 103, which are connected to a bus 104. The CPU 102 is preferably based on a 32-bit or 64-bit architecture. The CPU 102 may be, for example, a Core (trademark) i-series, Core (trademark) 2 series, Atom (trademark) series, Xeon (registered trademark) series, Pentium (registered trademark) series, or Celeron (registered trademark) series processor from Intel Corporation; an A-series, Phenom (trademark) series, Athlon (trademark) series, Turion (registered trademark) series, or Sempron (trademark) processor from Advanced Micro Devices (AMD) Inc.; or a Power (trademark) series processor from International Business Machines Corporation.

A display 106, such as a liquid crystal display (LCD), can be connected via a display controller 105 to the bus 104. The liquid crystal display may be a touch panel display or a floating touch display. The display 106 can be used to display, through an appropriate graphical interface, objects that can be displayed by operation of software running on the computer 101 (e.g., a computer program according to the embodiment of the present invention or various computer programs running on the computer 101).

A disk 108, such as a hard disk or a solid state drive (SSD), can be connected to the bus 104, for example, via a SATA or IDE controller 107.

A drive 109, such as a CD, DVD, or ED drive, can be optionally connected to the bus 104, for example, via the SATA or IDE controller 107.

A keyboard 111 and a mouse 112 can be optionally connected to the bus 104 via a peripheral controller 110, such as a keyboard/mouse controller or a USB bus.

The disk 108 can store an operating system, such as z/OS (registered trademark), z/VM (registered trademark), z/VSE (registered trademark), z/TPF, VOS3, UNIX (registered trademark), Windows (registered trademark), or Mac OS (registered trademark); a Java (registered trademark) processing environment, such as J2EE; a Java (registered trademark) application; a Java (registered trademark) virtual machine (VM); a program that provides a Java (registered trademark) Just-In-Time (JIT) compiler; the computer program according to the embodiment of the present invention and other programs; and data, in such a manner that they can be loaded into the main memory 103.

The disk 108 may be included in the computer 101, may be connected via a cable to the computer 101 such that the disk 108 can be accessed by the computer 101, or may be connected via a wired or wireless network to the computer 101 such that the disk 108 can be accessed by the computer 101.

The drive 109 can be used to install a program, such as an operating system, an application, or the computer program according to the embodiment of the present invention, from a CD-ROM, a DVD-ROM, or a BD, onto the disk 108 as necessary.

A communication interface 114 complies with, for example, the Ethernet (registered trademark) protocol. The communication interface 114 is connected via a communication controller 113 to the bus 104, and allows wired or wireless connection of the computer 101 to a communication line 115. The communication interface 114 provides a network interface layer for the TCP/IP communication protocol for the communication function of the operating system in the computer 101. The communication line 115 may be, for example, a wireless LAN environment based on a wireless LAN connection standard, a Wi-Fi wireless LAN environment such as IEEE802.11a/b/g/n, or a mobile phone network environment 3G or 4G environment).

Figure 2:
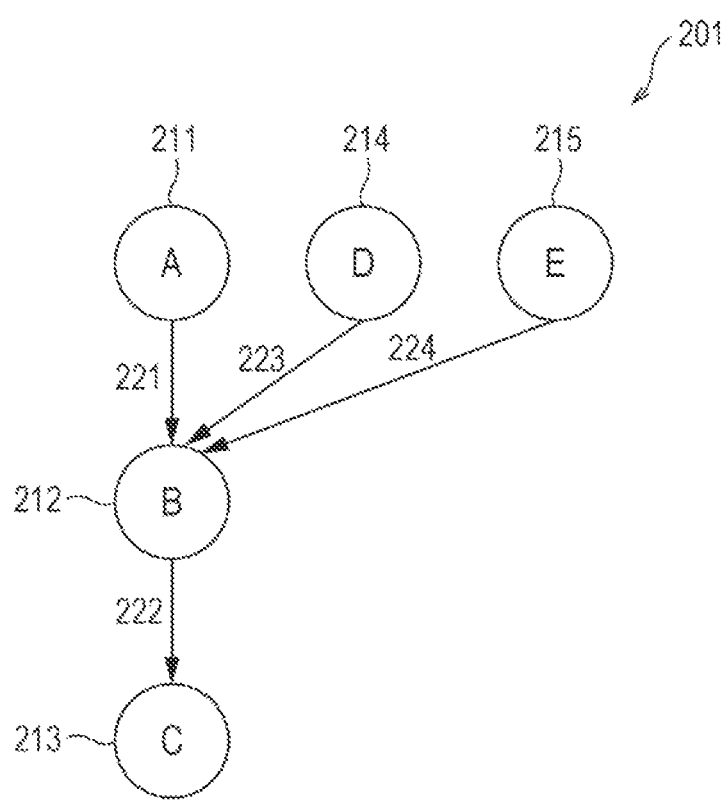
FIG. 2 illustrates a call graph that can be used in the embodiment of the present invention.

FIG. 2 illustrates a call graph that can be used in the embodiment of the present invention.

A call graph is also referred to as a multigraph, and is a directed graph that represents calling relationships between methods in a computer program. Generally, in the call graph, each node represents a procedure and each edge (A, B) indicates that procedure A calls procedure B.

In the call graph that can be used in the embodiment of the present invention, a method corresponds to a node and a method call corresponds to an edge. This call graph may be either dynamic or static.

The call graph that can be used in the embodiment of the present invention may be used to calculate an inline cost-effectiveness ratio for a callee method reachable from a method to be compiled.

A call graph 201 illustrated in FIG. 2 includes nodes 211, 212, 213, 214, and 215 corresponding to method A, method B, method C, method D, and method E, respectively, and edges 221, 222, 223, and 224 corresponding to a call from method A to method B, a call from method B to method C, a call from method D to method B, and a call from method E to method B, respectively.

For example, in a call from method B to method C, method B is a caller method and method C is a callee method.

Method A, method D, and method E are also referred to as call sites for method B.

FIGS. 3A and 3B are each a flowchart of an inlining process according to the embodiment of the present invention.

FIG. 3A is a flowchart for inlining a callee method according to the embodiment of the present invention.

In step S301, for source code written in a language to be subjected to inlining, a computer 301 starts a compile process using a compiler. The compiler may be either a static compiler or a dynamic compiler. In optimization during the compile process, the computer 301 starts the miming process according to the embodiment of the present invention.

Examples of the language used in the embodiment of the present invention and subjected to inlining include, but are not limited to, an object-oriented language (e.g., C++ or Java (registered trademark)) and a functional programming language using small functions.

In step S302, the computer 301 obtains a set of all callee methods $S_{callees}$ that can be called from one method to be compiled. The computer 301 may obtain the set $S_{callees}$, for example, from a call graph.

In step S303, the computer 301 determines whether any callee method unprocessed in step S305 (described below) remains in the set $S_{callees}$ obtained in step S303. If any unprocessed callee method remains, the computer 301 advances the process to step S304. On the other hand, if no unprocessed callee method remains, the computer 301 advances the process to step S308.

In step S304, the computer 301 fetches one unprocessed canoe method $M_{callee}$ from the set $S_{callees}$.

In step S305, the computer 301 calculates an inline cost-effectiveness ratio (global inlining efficiency ratio (GIER)) for the callee method $M_{callee}$ fetched in step S304 (i.e., the cost-effectiveness ratio of inlining the callee method $M_{callee}$) in accordance with the following equation. The computer 301 can use a call graph in calculating the GIER. The computer 301 calculates the GIER for each edge (i.e., callee method $M_{callee}$).

GIER=ratio between FrequencyRatio(edge) and SizeRatio(edge)

FrequencyRatio(edge) is calculated from $F_{caller-callee}/F_{total}$. That is, FrequencyRatio(edge) is the ratio of the frequency of calls to the callee method $M_{callee}$ ($F_{caller-callee}$; Frequency(edge)) to the total of call frequencies $F_{total}$; TotalFrequency). FrequencyRatio(edge) corresponds to "effectiveness" in the cost-effectiveness ratio.

SizeRatio(edge) is calculated from ($S_{callee}/S_{total}$). That is, SizeRatio(edge) is the ratio of the code size of the callee method ($S_{callee}$; CalleeSize(edge)) to the total size of inlinable code. SizeRatio(edge) corresponds to "cost" in the cost-effectiveness ratio.

The computer 301 may optionally use, for example, a call graph size calculated in accordance with the following equation as the total size of inlinable code ($S_{total}$; TotalInlineSize). Alternatively, the computer 301 may be optionally given a constant from the user as the total size of inlinable code ($S_{total}$; TotalInlineSize).

In the following equation, the total size of inlinable code ($S_{total}$) is a tuning parameter. An actual implementation experiment reveals that high cost-effectiveness can be achieved by using a value dynamically calculated in accordance with the following equation.

$$\text{TotalInlineSize} = \Sigma_{edge \in CallGraphEdges} \text{CalleeSize(edge)} \quad \text{(Equation 1)}$$

As indicated by the equation described above, since GIER is calculated only from information about the call frequency in profile information, it is not necessary to look through all call-graph edges. Also, since GIER is an absolute index, it is not necessary to make a comparison with other edges (i.e., callee methods).

The computer 301 can optionally change the GIER calculated using the above-described equation, in accordance with heuristics shown in one of the following (1) to (3). This change can further improve the effect of an algorithm at uses the GIER.

(1) The computer 301 counts the number of call sites for a callee method. If the number of call sites is greater than or equal to a predetermined threshold, the computer 301 makes the value of GIER less than or equal to a predetermined threshold. That is, the computer 301 makes the value of GIER less than or equal to a predetermined threshold so that the callee method is not inlined. By making the GIER less than or equal to the predetermined threshold in the above-described case, it is possible to prevent an increase in footprint and to eventually prevent an increase in the size of binary code generated by a compiler.

(2) If the code size of a callee method is greater than or equal to a predetermined threshold, the computer 301 makes the value of GIER less than or equal to a predetermined threshold. That is, the computer 301 makes the value of GIER less than or equal to the predetermined threshold so that the callee method is not inlined. By making the GIER less than or equal to the predetermined threshold in the above-described case, it is possible to prevent an increase in footprint and to eventually prevent an increase in the size of binary code generated by a compiler.

(3) If the number of call sites for a callee method is one, the computer 301 increases the value of GIER (e.g., the computer 301 doubles the value of GIER). That is, the computer 301 increases the value of GIER so that all callee methods are unconditionally inlined. By increasing the value of GIER in the above-described case, it is possible to facilitate inlining when there is no increase in footprint.

When the following conditions are met, the computer 301 can optionally change the frequency of calls to the callee method $M_{callee}$ ($F_{caller-callee}$). That is, in a multilevel call sequence where a first method calls a second method and the second method calls a third method, when the second method is determined to be inlined and a further determination is made as to whether to inline the third method, if there are multiple call sites (including the first method) for the second method, the computer 301 can correct the frequency of calls from the second method to the third method by using the ratio of the frequency of calls from the first method to the second method to the total of frequencies of calls from all the call sites to the second method. This correction will be described in detail with reference to FIG. 5.

In step S306, the computer 301 compares the value of GIER calculated step S305 with a predetermined threshold.

When the GIER is calculated from the ratio of FrequencyRatio(edge) to SizeRatio(edge), if the value of the GIER is greater than or equal to the predetermined threshold, the computer 301 advances the process to step S307 to inline the callee method $M_{callee}$. On the other hand, if the value of the GIER is less than the predetermined threshold in the above-described case, the computer 301 returns the process to step S303 without inlining the callee method $M_{callee}$.

When the GIER is calculated from the ratio of SizeRatio(edge) to FrequencyRatio(edge), if the value of the GIER is less than a predetermined threshold, the computer 301 advances the process to step S307 to inline the callee method $M_{callee}$. On the other hand, if the value of the GIER is greater than or equal to the predetermined threshold, the computer 301 returns the process to step S303 without inlining the callee method $M_{callee}$.

In step S307, the computer 301 inlines the callee method $M_{callee}$.

Also in step S307, the computer 301 adds all callee methods from the callee method $M_{callee}$ to the set $S_{callee}$. By adding all callee methods from the callee method $M_{callee}$ to the set $S_{callees}$, the computer 301 repeats steps S303 to 307 for each callee method reachable from methods including the inlined method.

Upon completion of step S307, the computer 301 returns the process to step S303 and repeats steps S303 to 307.

In step S308, the computer 301 determines whether there is any unprocessed method to be compiled. If there is an unprocessed method to be compiled, the computer 301 returns the process to step S302 to perform steps S302 to 307 for the unprocessed method. On the other hand, if there is no such an unprocessed method, the computer 301 advances the process to step S309.

In step S309, the computer 301 ends the compile process for the source code written in a language subjected to inlining.

FIG. 3B is a flowchart for updating profile information.

In step S311, the computer 301 starts a process of updating profile information. The process of updating profile information can be performed in parallel with, or independent of, the inlining process illustrated in FIG. 3A.

In step S312, the computer 301 detects a call from a caller method $M_{caller}$ to a callee method $M_{callee}$.

In step S313, each time the detection is made in step S312, the computer 301 updates a call graph in accordance with the following (1) to (3):

(1) If there is no node corresponding to the caller method $M_{caller}$ in the call graph, the computer 301 adds a node corresponding to the caller method $M_{caller}$ to the call graph;
(2) If there is no node corresponding to the callee method $M_{callee}$ in the call graph, the computer 301 adds anode corresponding to the callee method $M_{callee}$ to the call graph; and
(3) If there is no edge reachable from the caller method $M_{caller}$ to the callee method $M_{callee}$ in the call graph, the computer 301 adds such an edge to the call graph.

Also in step S313, the computer 301 increments the frequency of calls to the callee method ($F_{caller-callee}$) ($F_{caller-callee}^{++}$, for example, by one); increments the total of call frequencies ($F_{total}$) ($F_{total}^{++}$, for example, by one); and updates the total size of inlinable code ($S_{total}$), that is, adds the code size of $S_{callee}$ to $S_{total}$ ($S_{total}+=S_{callee}$).

The frequency of calls to the callee method ($F_{caller-callee}$) can be incremented ($F_{caller-callee}^{++}$) and the total of call frequencies ($F_{total}$) can be incremented ($F_{total}^{++}$) in response to the detection in step S312.

The total size of inlinable code ($S_{total}$) can be updated in response to the addition of an edge in (3) described above.

The updated total size of inlinable code ($S_{total}$), the incremented frequency of calls to the callee method ($F_{caller-callee}$), and the incremented total of call frequencies ($F_{total}$) are used in step S305 of FIG. 3A. Step S305 is performed separately from the process of the flowchart in FIG. 3B.

In step S313, the computer 301 determines whether to repeat steps S312 and s313. The determination as to whether to repeat steps S312 and s313 can be made, for example, depending on whether a call from the caller method $M_{caller}$ to the callee method $M_{callee}$ is detected before a predetermined time elapses. If steps S312 and s313 are to be repeated, the computer 301 returns the process to step S312. If steps S312 and s313 are not to be repeated, the computer 301 advances the process to step S314.

In step S314, the computer 301 ends the process of updating the profile information.

Figure 4:
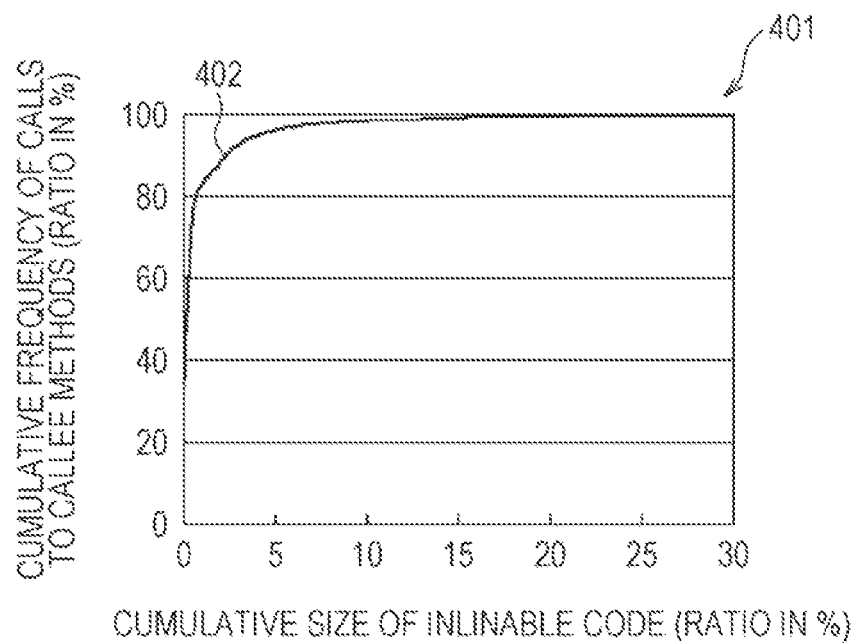
FIG. 4 is a graph that visualizes a cost-effectiveness ratio that can be required in the embodiment of the present invention.

FIG. 4 is a graph that visualizes a cost-effectiveness ratio that can be required in the embodiment of the present invention.

The graph of FIG. 4 shows a cumulative size of inlinable code (ratio expressed in % in the horizontal axis) and a cumulative frequency of calls to a callee method (ratio expressed in % in the vertical axis) when edges are sorted in descending order of GIER, in a call graph that can be actually obtained from benchmark software available from SPECjvm2008.

In the embodiment of the present invention, as shown in the flowchart of FIG. 3A, the calculation in step S305 (calculating step) and inlining in step S307 (inlining step) are repeated for each callee method reachable from methods, including an inlined method, until there is no callee method to be inlined.

GIER is represented by the slope of a curve 402 on the graph 401 shown in FIG. 4. The steeper the slope of the curve, the higher the call frequency and the lower the cost, and thus the higher the inline cost-effectiveness. Therefore, high inline cost-effectiveness can be achieved by inlining a portion corresponding to a steep slope of the curve.

The example of FIG. 4 shows that by inlining about 10% of edges (i.e., callee methods) in the call graph, it is possible to reduce about 99% or more of method calls.

GIER is used to extract about 10% of edges without looking through all call-graph edges. The predetermined GIER threshold shown in step S306 of FIG. 3A may be any value. For example, normalization is done to make the GIER threshold "1". When the GIER threshold is "1", the cost and the effectiveness are balanced. When normalization is done to make the GIER threshold "1", it is easy to set the GIER threshold.

It was found that by using, for example, "1" as the GIER threshold, the performance of many benchmark software products available from SPECjvm2008 was improved.

By using a value smaller than "1" as the GIER threshold, the ratio of inlined methods can be increased. That is, the computer becomes aggressive toward inlining. On the other hand, by using a value larger than "1" as the GIER threshold, the ratio of inlined methods can be reduced. That is, the computer becomes conservative toward inlining.

Figure 5:
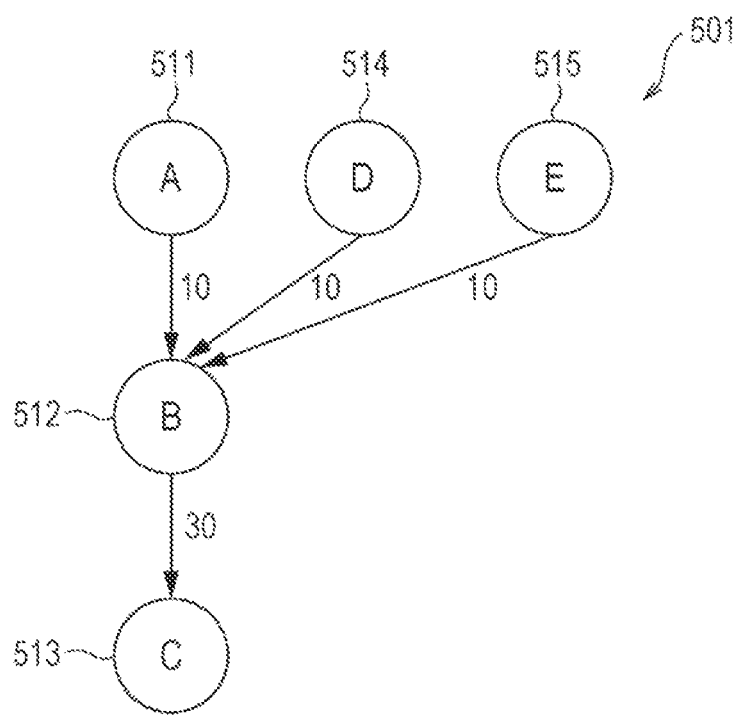
FIG. 5 is a call graph shown to describe correction of a call frequency in a call graph having a multilevel call sequence according to the embodiment of the present invention.

FIG. 5 is a call graph shown to describe correction of a call frequency in a call graph having a multilevel call sequence according to the embodiment of the present invention.

A call graph 501 shown in FIG. 5 has the same structure (nodes and edges) as that of the call graph 201 shown in FIG. 2. For details the call graph 501 shown in FIG. 5, refer to the description of the call graph 201 shown in FIG. 2.

The call graph 501 shown in FIG. 5 provides a multilevel call sequence where method A (511) on the first level calls method B (512) on the second level, method B (512) on the second level calls method C (513) on the third level.

It is already determined that method B (512) on the second level is to be inlined. Then the computer 101 is in the process of determining whether to inline method C (513). In the call graph 501, there are multiple call sites, including method A (511), for method B (512) which is already determined to be inlined. That is, method D (514) and method F (515) as well as method A (511) are call sites for method B (512).

In the above-described case, the computer 101 corrects the frequency of calls from method B (512) to method C (513) using the ratio of the frequency of calls from method A (511) to method B (512) to the total of the frequencies of calls from all the call sites (i.e., method A (511), method D (514), and method E (515)) to method B (512). This correction makes it possible to estimate the frequency of calls through method B (512), which is already determined to be inlined.

The correction can be made in accordance with the following equation.

$$CallFrequency_A(B \to C) = CallFrequency(B \to C) \times \frac{CallFrequency(A \to B)}{\sum_{cs \in Callers(B)} CallFrequency(cs \to B)}$$ (Equation 2)

The correction of the frequency of calls from method B (512) to method C (513) will now be described by using the example of the call graph 501.

The frequency of calls from method B (512) to method C (513) (i.e., the call frequency to be corrected) is 30%. The frequency of calls from method A (511) to method B (512) is 10%. The total of the frequencies of calls from all the call sites (i.e., method A (511), method D (514), and method E (515)) to method B (512) is 10%+10%+10%=30%.

Therefore, the frequency of calls from method B (512) to method C (513), CallFrequency$_A$(B→C), is corrected to 30× (10/30)=10%.

FIG. 6 is a functional block diagram of a computer that preferably has the hardware configuration of the computer 101 illustrated in FIG. 1 and performs an inlining process for inlining a callee method according to the embodiment of the present invention.

The computer 101 is a computer that performs an inlining process for inlining a callee method according to the embodiment of the present invention and may be, for example, the computer 101 illustrated in FIG. 1.

The computer 101 includes compile means 611.

The compile means 611 includes front end means 621 and optimizing means 622. The optimizing means 622 includes calculating means 631, determining means 632, inlining means 633, call graph updating means 635, and detecting means 634 which are added according to the embodiment of the present invention.

The front end means 621 includes a lexical analyzer, a syntax analyzer, and a semantic analyzer. The front end means 621 obtains source code 601 from a storage medium (e.g., the disk 108 shown in FIG. 1). The front end means 621 performs lexical analysis, syntax analysis, and semantic analysis on the obtained source code 601 in the same manner as in the related art and outputs compiler intermediate text.

The calculating means 631 calculates an inline cost-effectiveness ratio for a callee method reachable from a method to be compiled. The calculating means 631 fetches profile information 603 from a storage medium (e.g., the disk 108 shown in FIG. 1), and calculates the cost-effectiveness ratio by using the ratio of the frequency of calls to the callee method to the total of the call frequencies as effectiveness and using the ratio of the code size of the callee method to the total size of inlinable code as cost.

The calculating means 631 can calculate an inline cost-effectiveness ratio for a call-graph edge reachable from a method to be compiled on a call graph.

The calculating means 631 can repeat calculation of the cost-effectiveness ratio for each callee method reachable from methods, including an inlined method, until there is no callee method to be inlined.

In a multilevel call sequence where a first method calls a second method and the second method calls a third method, when the second method is determined to be inlined and a further determination is made as to whether to inline the third method, if there are multiple call sites (including the first method) for the second method, the calculating means 631 can correct the frequency of calls from the second method to the third method by using the ratio of the frequency of calls from the first method to the second method to the total of frequencies of calls from all the call sites to the second method.

The calculating means 631 can increment the frequency of calls to the callee method; increment the total of call frequencies; and update the total size of inlinable code after the call graph updating means 635 adds an edge described in (3) below to a call graph.

The determining means 632 determines whether to inline a callee method by comparing a cost-effectiveness ratio calculated by the calculating means 631 with a predetermined threshold.

The inlining means 633 inlines the callee method when the determining means 632 determines that the callee method is to be inlined.

If the number of call sites for the callee method is greater than or equal to a predetermined threshold, the inlining means 633 can be prevented from inlining the callee method.

If the code size of the callee method is greater than or equal to a predetermined threshold, the inlining means 633 can be prevented from inlining the callee method.

If the number of call sites for the callee method is one, the inlining means 633 can inline the callee method.

The call graph updating means 635 can update a call graph in the following cases (1) to (3):

(1) if there is no node corresponding to the caller method in the call graph, a node corresponding to the caller method is added to the call graph;
(2) if there is no node corresponding to the callee method in the call graph, a node corresponding to the callee method is added to the call graph; and
(3) if there is no edge reachable from the caller method to the callee method in the call graph, an edge reachable from the caller method to the callee method is added to the call graph.

The detecting means 634 detects a call from a method to a caller method.

The optimizing means 622 outputs binary code 602 inlined in accordance with the embodiment of the present invention.

A computer program according to an embodiment of the present invention can be stored in one or a plurality of computer-readable recording media, such as flexible disks, MOs, CD-ROMs, DVDs, BDs, hard disk devices, USB-connectable memory media, ROMs, MRAMs, and RAMs. For storage in such a recording medium, the computer program can be downloaded from another computer (e.g., server computer) connected via a communication line, or can be copied from another recording medium. The computer program according to the embodiment of the present invention may be compressed or divided into a plurality of pieces and stored in one or a plurality of recording medium. Note that a computer program product according to the embodiment of the present invention can be provided in various forms. The computer program product according to the embodiment of the present invention may include, for example, a storage medium in which the computer program is recorded, or a transfer medium for transferring the computer program.

Note that the summary of the present invention described above does not enumerate all essential features of the present invention, and that combinations and sub-combinations of components may also be included in the present invention.

For example, each hardware component of the computer used in the embodiment of the present invention may be combined with a plurality of machines, so that functions may be distributed thereto and implemented. It is obvious that such various changes can readily occur to those skilled in the art. It is to be understood that these changes are concepts included in the idea of the present invention. The components described above are merely examples and not all of them are essential components of the present invention.

The present invention can be implemented as hardware, software, or a combination of hardware and software. A typical example of the implementation by the combination of hardware and software may be implementation in a computer having the above-described computer program installed thereon. In this case, when the computer program is loaded in a memory of the computer and executed, the computer program controls the computer to perform processing according to the present invention. This computer program may be formed by a set of instructions that can be expressed in any language, code, or notation. Such a set of instructions enables the computer to perform processing according to the embodiment of the present invention directly, or after (1) conversion to another language, code or notation, and/or (2) copying to another medium.

According to the embodiment of the present invention, a computer can calculate inline cost-effectiveness from call frequency information alone, and can globally inline callee methods with high cost-effectiveness, without looking through all call-graph edges. It is thus possible to reduce profile overhead, reduce compile time, and achieve efficient inlining.

EXAMPLE

A computer program according to the embodiment of the present invention was implemented on the 64-bit IBM (registered trademark) Java (registered trademark) 1.7 JIT Compiler.

A platform environment used is as follows. Processor: IBM (registered trademark) zEC12 processor (5.5 GHz, 4 cores); and OS: IBM (registered trademark) z/OS (registered trademark).

As benchmark software, 12 types of benchmark software available from SPECjvm2008 were used.

Profile information in a call graph was collected by an online profiler using runtime instrumentation (RI) for the zEC12 processor. There is practically no overhead in this collection.

An edge whose value of GIER (i.e., the ratio of effectiveness (ratio of the frequency of calls to the callee method to the total of call frequencies) to cost (ratio of the code size of a callee method to the total size of inlinable code)) exceeds one was inlined. There is no threshold for each compile method.

Comparative Example 1

Baseline

An inlining technique (for static compilers) incorporated by default in the 64-bit IBM (registered trademark) Java (registered trademark) 1.7 JIT Compiler was used. An edge to be inlined was determined using a heuristic technique in which callee methods are inlined basically in ascending order of code size, without using a call graph. There is an inline size threshold for each compile method. A platform environment and benchmark software are the same as those in Example.

Comparative Example 2

An inlining technique combining the technique of Comparative Example 1 with a call graph was used. For an edge to be inlined, profile information from a call graph was used to calculate a cost-effectiveness ratio as a ratio of the call frequency to the code size of a callee method, and callee methods were inlined in descending order of the calculated cost-effectiveness ratio. As in Comparative Example 1, there is an inline size threshold for each compile method. A platform environment and benchmark software are the same as those in Example.

(Throughput)

Throughput in Example was 3.7% higher than that in Comparative Example 1 (baseline) on average in the 12 types of benchmark software, and was up to 10.8% higher depending on the type of benchmark software. On the other hand, throughput in Comparative Example 2 was often lower than that in Comparative Example 1 (baseline).

(Relative Size of Inlined Code)

The relative size of inlined code in Example was much smaller than that in Comparative Example 1 (baseline) on average in the 12 types of benchmark software. This is because in the embodiment of the present invention, inlining with low cost-effectiveness was eliminated. The relative size of inlined code in Comparative Example 2 was smaller than that in Comparative Example 1 (baseline), but was larger than that in Example. This is because since, in the method of Comparative Example 2, inlining continues as long as the inlined code size is well within the threshold, the inlined code size in Comparative Example 2 is larger than that in the method according to the embodiment of the present invention.

(Compile Time)

The compile time in Example was shorter than that in Comparative Example 1 (baseline) on average in the 12 types of benchmark software. The compile time in Comparative Example 2 was longer than that in Comparative Example 1.

The invention claimed is:

1. A method, executed by a computer, for inlining, comprising:
    calculating, by a processor in the computer, an inline cost-effectiveness ratio for a callee reachable from a caller to be compiled, wherein calculating the inline cost-effectiveness ratio includes using a ratio of a frequency of calls to the callee to a total of frequencies of calls as effectiveness in the inline cost-effectiveness ratio, and using a ratio of a code size of the callee to a total size of inlinable code as cost in the inline cost-effectiveness ratio;
    determining, by the processor in the computer, whether to inline the callee by comparing the inline cost-effectiveness ratio with a predetermined threshold; and
    inlining, by the processor in the computer, the callee into a source code in response to determining that the callee is to be inlined.

2. The method according to claim 1, further comprising:
    for each callee in a set of callees reachable from the caller:
        repeating, by the processor in the computer, the calculating of the inline cost-effectiveness ratio for the callee, the determining of whether to inline the callee, and the inlining of the callee into a source code in response to the callee being determined to be inlined.

3. The method according to claim 1, wherein if a number of call sites for the callee is greater than or equal to a first predetermined threshold, or if a code size of the callee is greater than or equal to a second predetermined threshold, the callee is not inlined.

4. The method according to claim 3, wherein responsive to the number of call sites for the callee being one, the callee is inlined.

5. The method according to claim 1, further comprising:
    calculating, by the processor in the computer, the total of frequencies of calls by adding up frequencies of calls during collection of profile information; and
    calculating, by the processor in the computer, the total size of inlinable code by adding up sizes of inlinable code during the collection of the profile information.

6. The method according to claim 1, further comprising:
    in a multilevel call sequence where a first caller calls a first callee and the first callee becomes a second caller and calls a second callee, correcting, by the processor in the computer, a frequency of calls from the second caller to the second callee if, when the second caller is determined to be inlined and a further determination is made as to whether to inline the second callee, there are multiple call sites including the first caller for the first callee, wherein the correcting is performed by using a ratio of a frequency of calls from the first caller to the first callee to a total of frequencies of calls from all of the multiple call sites to the first callee.

7. The method according to claim 1, wherein calculating the inline cost-effectiveness ratio includes calculating, by the processor in the computer, an inline cost-effectiveness ratio for a call-graph edge reachable from the caller in a call graph.

8. The method according to claim 7, further comprising:
    detecting, by the processor in the computer, a call from the caller to the callee;
    adding, by the processor in the computer, a node corresponding to the caller to the call graph if there is no node corresponding to the caller in the call graph;
    adding, by the processor in the computer, a node corresponding to the callee to the call graph if there is no node corresponding to the callee in the call graph;
    adding, by the processor in the computer, an edge reachable from the caller to the callee to the call graph if there is no edge reachable from the caller to the callee in the call graph;
    incrementing, by the processor in the computer, the frequency of calls to the callee;
    incrementing, by the processor in the computer, the total of frequencies of calls; and
    updating, by the processor in the computer, the total size of inlinable code in response to an addition of the edge in adding the edge reachable from the caller to the callee to the call graph if there is no edge reachable from the caller to the callee in the call graph.

9. The method according to claim 1, wherein the callee is inlined in response to the inline cost-effectiveness ratio being greater than or equal to the predetermined threshold.

10. The method according to claim 1, wherein the callee is not inlined in response to the inline cost-effectiveness ratio being less than the predetermined threshold.

11. A computer for performing inlining, comprising:
    a processor; and
    a memory coupled to the processor, wherein the memory stores instructions which, when executed by the processor, cause the processor to:
    calculate an inline cost-effectiveness ratio for a callee reachable from a caller to be compiled, wherein calculating the inline cost-effectiveness ratio includes using a ratio of a frequency of calls to the callee to a total of frequencies of calls as effectiveness in the inline cost-effectiveness ratio, and using a ratio of a code size of the callee to a total size of inlinable code as cost in the inline cost-effectiveness ratio;
    determine whether to inline the callee by comparing the inline cost-effectiveness ratio with a predetermined threshold; and
    inline the callee into a source code in response to determining that the callee is to be inlined.

12. The computer according to claim 11, wherein the instructions further cause the processor to:
    for each callee in a set of callees reachable from the caller:
        repeat the calculation of the inline cost-effectiveness ratio for the callee, the determining of whether to inline the callee, and the inlining of the callee into a source code in response to the callee being determined to be inlined.

13. The computer according to claim 11, wherein if a number of call sites for the callee is greater than or equal to a first predetermined threshold, or if a code size of the callee is greater than or equal to a second predetermined threshold, the instructions further cause the processor to not inline the callee.

14. The computer according to claim 13, wherein responsive to the number of call sites for the callee being one, the instructions further cause the processor to inline the callee.

15. The computer according to claim 11, wherein the instructions further cause the processor to:

calculate the total of frequencies of calls by adding up frequencies of calls during collection of profile information; and calculate the total size of inlinable code by adding up sizes of inlinable code during the collection of the profile information.

16. The computer according to claim 11, wherein the instructions further cause the processor to:

in a multilevel call sequence where a first caller calls a first callee and the first callee becomes a second caller and calls a second callee, correct a frequency of calls from the second caller to the second callee if, when the second caller is determined to be inlined and a further determination is made as to whether to inline the second callee, there are multiple call sites including the first caller for the first callee, wherein the correcting is performed by using a ratio of a frequency of calls from the first caller to the first callee to a total of frequencies of calls from all of the multiple call sites to the first callee.

17. The computer according to claim 11, wherein the instructions to calculate the inline cost-effectiveness ratio further cause the processor to:

calculate an inline cost-effectiveness ratio for a call-graph edge reachable from the caller in a call graph.

18. The computer according to claim 17, wherein the instructions further cause the processor to:

detect a call from the caller to the callee;

add a node corresponding to the caller to the call graph if there is no node corresponding to the caller in the call graph;

add a node corresponding to the callee to the call graph if there is no node corresponding to the callee in the call graph;

add an edge reachable from the caller to the callee to the call graph if there is no edge reachable from the caller to the callee in the call graph;

increment the frequency of calls to the callee;

increment the total of frequencies of calls; and update the total size of inlinable code in response to an addition of the edge in adding the edge reachable from the caller to the callee to the call graph if there is no edge reachable from the caller to the callee in the call graph.

19. A computer program product for inlining comprising a non-transitory computer readable storage medium having a computer readable program stored therein, wherein the computer readable program, when executed on a computing device, causes the computing device to:

calculate an inline cost-effectiveness ratio for a callee reachable from a caller to be compiled, wherein calculating the inline cost-effectiveness ratio includes using a ratio of a frequency of calls to the callee to a total of frequencies of calls as effectiveness in the inline cost-effectiveness ratio, and using a ratio of a code size of the callee to a total size of inlinable code as cost in the inline cost-effectiveness ratio;

determine whether to inline the callee by comparing the inline cost-effectiveness ratio with a predetermined threshold; and inline the callee into a source code in response to determining that the callee is to be inlined.

* * * * *